June 9, 1936. J. E. McNEIL 2,043,442
TOOL HOLDER
Filed March 21, 1935 2 Sheets-Sheet 1
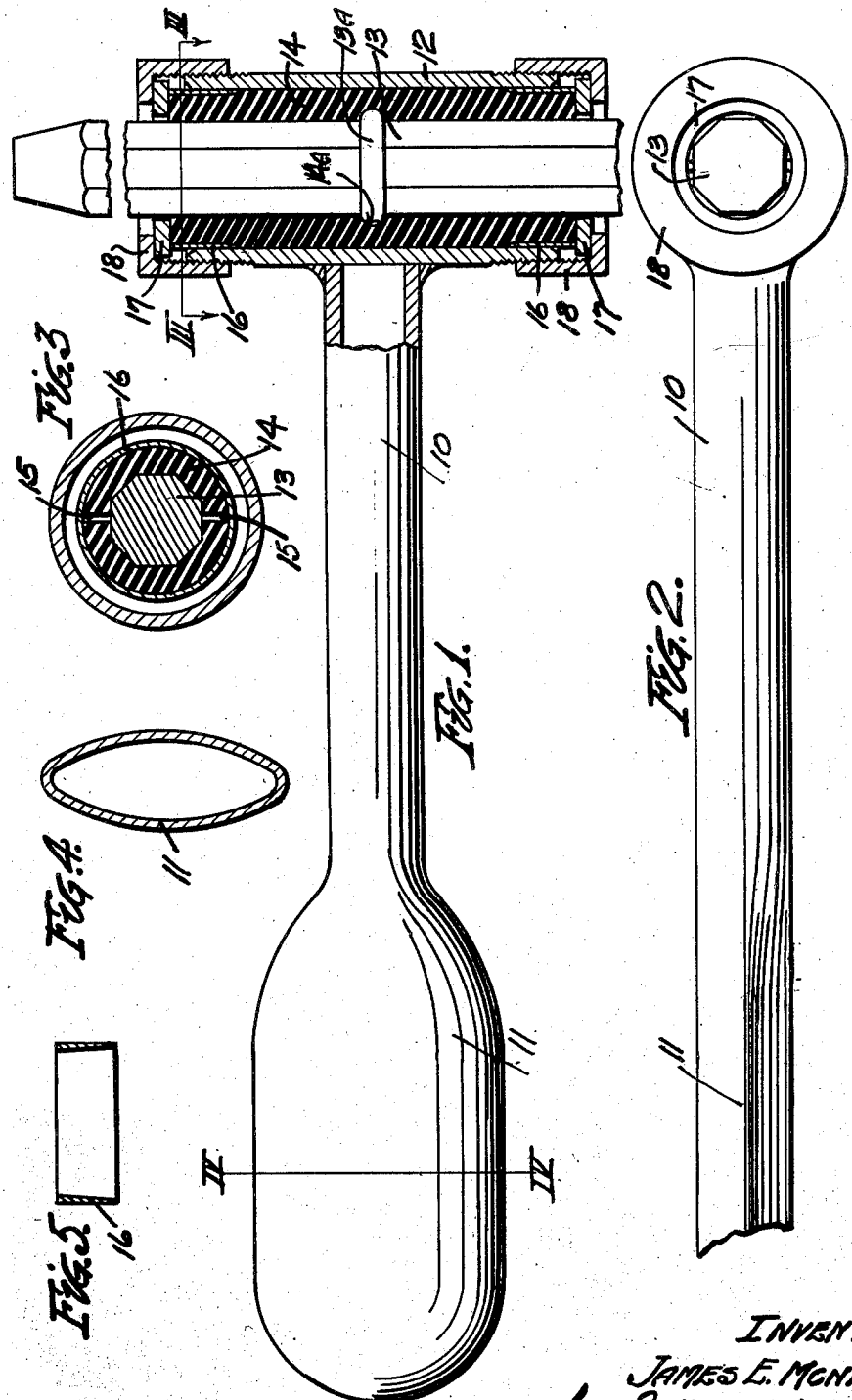

June 9, 1936. J. E. McNEIL 2,043,442
TOOL HOLDER
Filed March 21, 1935 2 Sheets-Sheet 2
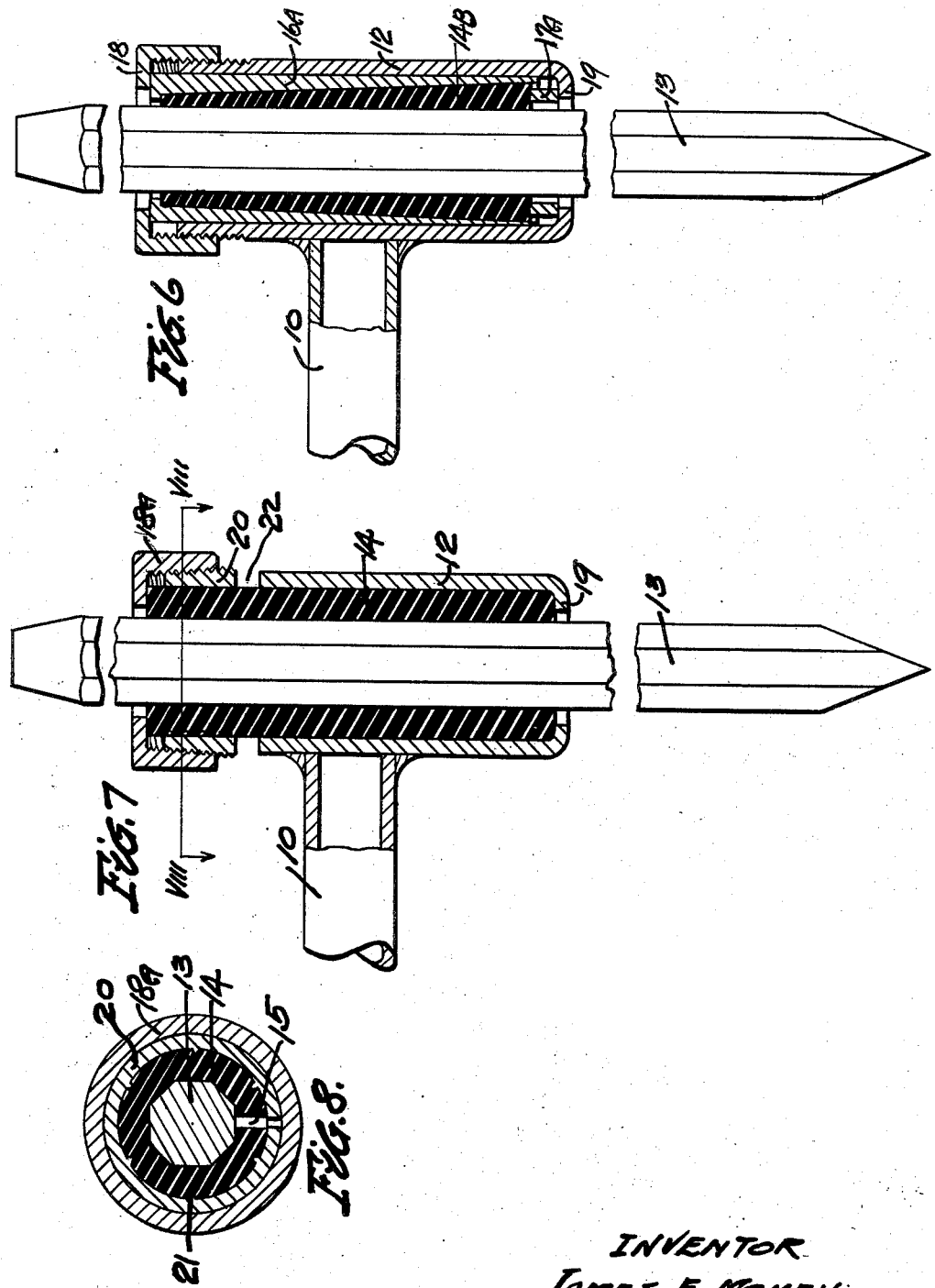

Patented June 9, 1936

2,043,442

UNITED STATES PATENT OFFICE 2,043,442

TOOL HOLDER

James E. McNeil, Memphis, Tenn.

Application March 21, 1935, Serial No. 12,159

6 Claims. (Cl. 81—1)

This invention relates to improvements in tool holders particularly for chisels, punches, or similar devices, the points of which must be held against the work while the head is struck with a hammer; and in which it is necessary that the type particularly of cutting edge on the tool, be varied from time to time and often also that the shape and size of tool as well as its length, be varied; and in which it is also necessary that the angularity of the cutting edge with respect to the handle portion thereof be varied.

For many purposes such as the wrecking of automobiles, it is necessary to cut off rivet heads, to cut in two certain parts and to generally perform cutting operations such as are most effectively accomplished by the use of a chisel and hammer. The points of these chisels necessarily vary—flat wedge shaped points, rounded or "cape" chisel points, diamond points, punches, and perhaps other varied shapes being used often in rapid succession upon the same work.

In the use of many of these tools other than the punch, the tool usually must be rotated about its longitudinal axis in order that it may be properly seated against the part to be cut, thus requiring either that the tool be hand held, or if provided with handles, that an inordinate number of such tools be provided to facilitate accomplishment of the work. Where the tools are directly held by hand, there is not only the ordinary danger incident to the use of hand held chisels of striking the hand, but there is the additional danger to the hand, that the chisel point will slip and the hand be driven against some adjacent part, or of the cut being completed and the hand being driven against the work, and operations must be, or at least are, greatly slowed down by the fear on the part of the operator that the cut is practically complete and the incident easing up of the blows on that account. Where handled tools are used the length of the tool, if great enough for difficult accessible work, is often greater than is economically advisable for the general run of the work.

The objects of the invention are:

To provide a tool holder in which tools of varied size and length, and having varied shapes of cutting edge may readily be placed adjusted and secured, and in which shocks incident to the use of the cutting tool may be cushioned against direct transmission to the socket and other portions;

To provide a tool holder having clamping action on the tool, whereby vibration and noise is minimized; and To provide a holder having a hand grip portion adapted to be firmly held and when so held, available to control definitely the positioning of the point of the tool.

The means by which the foregoing and other objects are accomplished and the manner of their accomplishment, will readily be understood from the following specification on reference to the accompanying drawings in which,—

Fig. 1 is a side view of the holder with the tool socket in section.

Fig. 2 is a plan view of the holder and tool.

Fig. 3 is a transverse section of the socket taken on the line III—III of Fig. 1, and Fig. 4 a section of the hand grip taken as on the line IV—IV of Fig. 1.

Fig. 5 is a section of a modified form of sleeve.

Figs. 6 and 7 are sectional elevations of modified forms of the tool socket portion of the device; and Fig. 8 a section on the line VIII—VIII of Fig. 7.

Referring now to the drawings in which the various parts are indicated by numerals, 10 is the handle having a flattened substantially elliptical hand-grip portion 11, and a cylindrical tool socket 12, having its opposite ends exteriorly threaded. 13 is a typical chisel or tool to be held, this chisel having a circumferential rib 13A. 14 is a rubber sleeve which may continuously surround the chisel, but is preferably made in two halves as shown in section in Fig. 3, the halves being such that when assembled around the tool, they are separated by longitudinal slots or openings 15; though obviously the sleeve may be in one piece with only one of the slots 15. The sleeve 14 is preferably longer than the socket 12, so that it projects beyond the ends thereof, and is provided with a groove 14A to receive the rib 13A. Surrounding the opposite ends of the sleeve are clamping rings 16, which are adapted to be slid down along the inside of the socket 12, against and inwardly compressing the sleeve 14. These rings may be of uniform thickness throughout, but preferably are longitudinally tapered as shown in Figs. 5 and 7. Washers 17 may be used if desired, if used they are seated against the ends of the rings 16, which are retained and forced compressively against the sleeve by annular caps 18 which are threaded and screwed down upon the threaded portions of the socket 12. Preferably sleeves 14 of various internal diameters are provided so that chisels of a limited range of sizes may be used. Preferably the sleeves are cylindrical internally, even though used as they ordinarily are with tools of octagonal or hexagonal stock. These sleeves are used primarily to absorb the inertia of the handle socket when a blow is struck on the tool and to thereby not only reduce the loss in effectiveness of the blow incident to the weight of such socket, but also to prevent longitudinal creeping of the tool through the socket. They also function to absorb lateral shocks between tool and handle, but preferably exert only a minor resistance to rotation of the tool, whereby it is possible to axially turn the tool to seat the cutting edge thereof against the work in cases where the handle may not readily be so turned. The washers 17 if used, also preferably are changed to conform to the tool size used, preferably slidably contacting, but not gripping the tool.

In Fig. 6 a modification is shown in which the upper end only of the socket 12 is threaded and provided with a cap 18 having complementary threads, the lower end of the socket having an inwardly turned, annular flange portion 19 in lieu of a second cap. In this modification the rubber sleeve 14B is externally tapered, the larger end of the sleeve being seated on a washer 17A disposed in the bottom of the socket. The ring 16A which surrounds the sleeve 14A has been lengthened to extend substantially from end to end of the sleeve. As before it externally fits the cylindrical bore of the socket 12 and is internally coned to conform to the tapered sleeve 14B. The lower end of the ring 16A may if necessary be forced downward past the top of the washer 17A.

In Fig. 7 a further modification is shown in which the upper end of the sleeve 14 is clamped to the chisel 13 by a split ring 20 and a cap 18A. The exterior of the ring 20 is coned and threaded and the interior of the cap 18A is coned and threaded in complementary manner, so that when the cap 18A is screwed on the ring 20 it will be clamped against the sleeve 14 and this sleeve in turn clamped to the tool 13. In order to provide a clamp for holding the ring 20, it may be provided with sharp teeth 21 which dig into the rubber of the sleeve 14. The sleeve 14 is clamped to the tool 13, and pushed down in the socket 12. The sleeve is of such length that a gap 22 is maintained between the ring 20 and the upper end of the socket 12 when the rubber sleeve 14 is seated in the socket.

It will be understood that the lower end of the socket 12 in the form shown in Fig. 1 may be provided with an inwardly turned annular flange corresponding to the flange 19 of Figs. 6 and 7 in lieu of the lower cap 18 in Fig. 1, and also that if it be deemed necessary, the lower cap 18 shown in Fig. 1 may be used with either of the modified forms.

While a rubber sleeve is preferred, it is obvious that other resilient material may be used if desired or necessary.

To prepare the form shown in Fig. 1 a sleeve of proper bore, is placed around the tool with the rib 13A in the groove 14A of the sleeve. The tool and sleeve are then placed in the socket and is turned to position, the cutting edge as desired, and the two rings 16 are started over the ends of the sleeve. The caps with washers laid therein are positioned, their threads engaged with the socket threads, and the caps are firmly screwed down forcing the rings over the sleeve and compressing the sleeve against the tool.

In using that form of the device shown in Fig. 6, the sleeve 14B is dropped in the socket 12 resting on the washer 17A or if it be so desired, directly against the flanged end 19, the tool is slid through the rubber sleeve to proper position, the ring 16A is dropped in place over the sleeve 14B and the cap 18 screwed down against the end of the ring to force the latter to place. The tool may then be put in use but ordinarily after a few blows have been struck on the chisel it is found necessary to further tighten the cap 18, and usually, even to do this a second or a third time before the grip of the rubber sleeve on the tool is firmly accomplished.

In the modification shown in Fig. 7 the ring 20 is placed around the rubber sleeve adjacent the upper end thereof and the cap 18A screwed down to clamp the rubber to the tool. As clamping progresses, the teeth 21 dig into the rubber and it is possible by firmly gripping the rubber below the ring 20 to hold the rubber and the ring thereon against turning while the cap 18A is being screwed down to clamp the rubber to the tool. As soon as the rubber has been clamped to the tool it may be slid down into and positioned in the socket and is then ready for use.

In using the tool, the cutting edge of the chisel is positioned against the work in usual manner and the usual hammer used. It will be noted however that the flattened hand-grip permits directing the tool edge against the work and when the tool is in place, controlling it effectually under use.

It will be understood that in those forms of the device shown in which the sleeve is laterally clamped against the tool to prevent lateral displacement of the tool relative to the rubber, the clamping rings are necessarily loose enough in the socket to move longitudinally and also to rotate about the axis of the tool and rotation is therefore resisted only by the action of the grip against the end of the ring and the friction of the end of the resilient sleeve against the inwardly flanged end of the socket. It will also be clearly understood that where the annular rib on the tool is used that the purpose of the sleeve is likewise to prevent longitudinal movement only and not rotational movement.

What I claim is:

1. In a device of the character described, an elongated tool; a resilient sleeve disposed around said tool, means clamping said sleeve to said tool to resist displacement of said tool relative to said sleeve, and a holder including a handle and an annular socket secured thereto, said socket being adapted to receive said sleeve and having annular closure means at one end thereof adapted to prevent the endwise passage of said sleeve.

2. In a tool holder for use with an elongated tool; a tubular socket threaded at opposite ends, a resilient split sleeve disposed in said socket and projecting beyond both ends thereof, annular rings adapted to slide longitudinally into said socket, and each to circumferentially encompass and radially compress an end of said sleeve, washers, each engaging an end of said sleeve and of a said ring, and threaded caps, each engaging a threaded end of said socket, and seating against a said washer.

3. In a tool holder for use with an elongated tool; a tubular socket threaded at opposite ends, a resilient sleeve disposed in said socket, annular rings adapted to slide longitudinally into said socket, and each to circumferentially encompass and radially compress an end of said sleeve, and threaded caps, each engaging a threaded end of said socket, and longitudinally moving said rings and compressing said sleeve.

4. In a tool holder for use with an elongated tool; a tubular socket having a threaded end, a resilient sleeve disposed in said socket, means at the bottom end of said socket supporting said sleeve, said sleeve being exteriorly tapered, an annular ring adapted to slide longitudinally into said socket and to circumferentially encompass said sleeve, said ring being interiorly tapered in complementary manner to said sleeve, and an annular threaded cap engaging said threaded end of said socket, and the upper end of said ring, and adapted to longitudinally advance said ring and laterally compress said sleeve.

5. In a tool holder for use with an elongated tool; a tubular socket having an annular, inwardly flanged bottom end, and a threaded upper end, a resilient sleeve disposed in said socket, and supported by said flanged end, said sleeve being exteriorly tapered, and enlarging from top to bottom, an annular ring adapted to slide longitudinally into said socket and to circumferentially encompass said sleeve, said ring being interiorly tapered in complementary manner to said sleeve, and an annular, threaded cap engaging said threaded end of said socket, and seated against the upper end of said ring whereby said cap may be screwed down on said threaded end to advance said ring and laterally compress said sleeve.

6. In a device of the character described, an elongated tool having a circumferential rib, a resilient sleeve disposed around said tool, said sleeve being grooved to receive said rib and substantially prevent longitudinal displacement of said tool relative to said sleeve, and a holder including a handle, and an annular socket carried thereby, said socket being adapted to receive said sleeve and having annular closure members one at each end thereof overlying the ends of said sleeve and adapted to prevent endwise displacement thereof.

JAMES E. McNEIL.